(12) United States Patent
Hsiao et al.

(10) Patent No.: US 8,625,036 B2
(45) Date of Patent: Jan. 7, 2014

(54) 3D GLASSES AND 3D VIDEO PLAYING APPARATUS

(75) Inventors: Chia-chiang Hsiao, Shenzhen (CN);
Chih-wen Chen, Shenzhen (CN);
Chengming He, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 130 days.

(21) Appl. No.: 13/377,547

(22) PCT Filed: Oct. 12, 2011

(86) PCT No.: PCT/CN2011/080699
§ 371 (c)(1),
(2), (4) Date: Dec. 10, 2011

(87) PCT Pub. No.: WO2013/013447
PCT Pub. Date: Jan. 31, 2013

(65) Prior Publication Data
US 2013/0027619 A1    Jan. 31, 2013

(30) Foreign Application Priority Data
Jul. 26, 2011    (CN) .......................... 2011 2 0267081

(51) Int. Cl.
*G02F 1/1335* (2006.01)
(52) U.S. Cl.
USPC .................. 349/13; 349/15; 349/9

(58) Field of Classification Search
USPC ................................... 349/13, 15, 9
See application file for complete search history.

(56) References Cited

U.S. PATENT DOCUMENTS 6,222,672 B1 *   4/2001   Towler et al. ................. 359/465
8,284,333 B2 *  10/2012   Lin et al. ........................ 349/13

FOREIGN PATENT DOCUMENTS

| CN | 201689216 U | 12/2010 |
| CN | 101943824 A | 1/2011 |
| CN | 102036086 A | 4/2011 |
| CN | 201796191 U | 4/2011 |
| CN | 102087419 A | 6/2011 |

OTHER PUBLICATIONS

International Search Report of the PCT Application No. PCT/CN2011/080699.

* cited by examiner

*Primary Examiner* — Mike Qi

(57) ABSTRACT

The present disclosure relates to a pair of 3D glasses and a 3D video playing apparatus. A quarter-wave phase plate is provided at the end of a liquid crystal display (LCD) and the end of the pair of 3D glasses respectively so that the light propagates in the form of the circularly polarized light from a 3D display device to the pair of 3D glasses. Thereby, the technical shortcoming of a decreased luminance of an image or even failure to form an image due to an inappropriate angle included between the pair of 3D glasses and the 3D display device is overcome.

1 Claim, 5 Drawing Sheets

3D GLASSES AND 3D VIDEO PLAYING APPARATUS

BACKGROUND

1. Technical Field

The present disclosure relates to the technical field of displaying, and more particularly, to a pair of 3D glasses and a 3D video playing apparatus.

2. Description of Related Art

With the continuous advancement and development of the science and technology, 3D videos are attracting more and more attentions. The 3D videos are greatly favored by many consumers as they can provide a real-world feeling and a visual impact when being played. Currently, the most common device for achieving the 3D effect in the market is a kind of light gate glasses, whose two glasses are installed with a light gate respectively. The two light gates are opened and closed alternately in such a way that when one of the two light gates is opened, the other is closed. Thus, one image can be seen by only one eye. Because the image can keep a visual persistence of about 0.15 s in human eyes, the image in the eye will not disappear so long as a time interval during which the same glass is closed is less than 0.15 s. In this way, although the image is not seen by this eye, the image still persists in the brain, so a 3D image can be composed in the brain.

Referring to FIG. 1, there is shown a schematic structural view of an embodiment of a 3D video playing apparatus in the prior art. In the prior art, a first polarizer 3 is often disposed on a display 1; and a pair of 3D glasses for use with the display 1 comprises a second polarizer 4, a liquid crystal layer 2 and a third polarizer 5. The liquid crystal layer 2 is located between the second polarizer 4 and the third polarizer 5; a transmittance axis of the first polarizer 3 is parallel with a transmittance axis of the second polarizer 4; and a transmittance axis of the third polarizer 5 is perpendicular to the transmittance axis of the second polarizer 4. Through control of twisting of liquid crystals in the liquid crystal layer 2, functions of a light gate can be achieved. A user can observe a 3D image at a side of the pair of 3D glasses away from the display 1. However, as the pair of 3D glasses is worn on the head of the user, the luminance of the image will decrease when the transmittance axis of the second polarizer 4 becomes unparallel with the transmittance axis of the first polarizer 3 disposed on the display 1; and when the transmittance axis of the second polarizer 4 becomes perpendicular to the transmittance axis of the first polarizer 3 disposed on the display, the light exiting from the display 1 will be completely absorbed by the second polarizer 4 and, as a result, no image can be seen by the user.

BRIEF SUMMARY

The primary objective of the present disclosure is to provide a pair of 3D glasses and a 3D video playing apparatus in order to overcome the technical shortcoming of a decreased luminance of an image or even failure to form an image, which due to an inclined angle included between a 3D display device and the pair of 3D glasses.

The present disclosure provides a pair of 3D glasses, which comprises a left glass and a right glass in symmetry with each other. Each of the glasses comprises a liquid crystal layer as well as a second quarter-wave phase plate and a second polarizer disposed at two sides of the liquid crystal layer respectively. Both the second quarter-wave phase plate and the second polarizer match with the liquid crystal layer.

Preferably, the pair of 3D glasses further comprises a second half-wave phase plate which is disposed between the second quarter-wave phase plate and the liquid crystal layer and matches with the liquid crystal layer.

Preferably, when a polarizing axis of the second half-wave phase plate and an absorbance axis of the second polarizer include an angle of $-\theta_2$ there between, a polarizing axis of the second quarter-wave phase plate and the absorbance axis of the second polarizer include an angle of $-2\theta_2-45°$ there between.

The present disclosure further provides a 3D video playing apparatus, which comprises a 3D display device and the pair of 3D glasses as described above. The 3D display device comprises a liquid crystal display (LCD), a first polarizer and a first quarter-wave phase plate. A surface of the first polarizer abuts on a light exiting surface of the LCD. The first polarizer matches with the light exiting surface of the LCD. The first quarter-wave phase plate is disposed on the other surface of the first polarizer and matches with the light exiting surface of the LCD. The pair of 3D glasses is located at the side of the light exiting surface of the 3D display device and in a light path of the 3D display device with the second quarter-wave phase plates of the pair of 3D glasses facing towards the light exiting surface of the 3D display device.

Preferably, the 3D display device further comprises a first half-wave phase plate that is disposed between the first polarizer and the first quarter-wave phase plate and matches with the light exiting surface of the LCD.

Preferably, the pair of 3D glasses further comprises a second half-wave phase plate that is disposed between the second quarter-wave phase plate and the liquid crystal layer and matches with the liquid crystal layer.

Preferably, when a polarizing axis of the first half-wave phase plate and a transmittance axis of the first polarizer include an angle of $\theta_1$ there between, a polarizing axis of the first quarter-wave phase plate and the transmittance axis of the first polarizer include an angle of $2\theta_1+45°$ there between. When a polarizing axis of the second half-wave phase plate and an absorbance axis of the second polarizer include an angle of $-\theta_2$ there between, a polarizing axis of the second quarter-wave phase plate and the absorbance axis of the second polarizer include an angle of $-2\theta_2-45°$ there between.

The present disclosure further provides another 3D video playing apparatus, which comprises a 3D display device and the pair of 3D glasses as described above. The 3D display device comprises an LCD, a first polarizer, a first quarter-wave phase plate and a first half-wave phase plate. A surface of the first polarizer abuts on a light exiting surface of the LCD. The first polarizer matches with the light exiting surface of the LCD. The first quarter-wave phase plate is disposed on the other surface of the first polarizer and matches with the light exiting surface of the LCD. The first half-wave phase plate is disposed between the first polarizer and the first quarter-wave phase plate and matches with the light exiting surface of the LCD. The pair of 3D glasses is located at the side of the light exiting surface of the 3D display device and in a light path of the 3D display device with the second quarter-wave phase plates of the pair of 3D glasses facing towards the light exiting surface of the 3D display device. The pair of 3D glasses further comprises a second half-wave phase plate that is disposed between the second quarter-wave phase plate and the liquid crystal layer and matches with the liquid crystal layer.

Preferably, when a polarizing axis of the first half-wave phase plate and a transmittance axis of the first polarizer include an angle of $\theta_1$ there between, a polarizing axis of the first quarter-wave phase plate and the transmittance axis of the first polarizer include an angle of $2\theta_1+45°$ there between. When a polarizing axis of the second half-wave phase plate and an absorbance axis of the second polarizer include an angle of $-\theta_2$ there between, a polarizing axis of the second quarter-wave phase plate and the absorbance axis of the second polarizer include an angle of $-2\theta_2-45°$ there between.

According to the pair of 3D glasses and the 3D video playing apparatus of the present disclosure, a quarter-wave phase plate (comprising a first quarter-wave phase plate and a second quarter-wave phase plate) is provided at the end of the LCD and the end of the pair of 3D glasses respectively so that the light propagates in the form of the circularly polarized light from the 3D display device to the pair of 3D glasses. Thereby, the technical shortcoming of a decreased luminance of an image or even failure to form an image due to an inappropriate angle included between the pair of 3D glasses and the 3D display device is overcome. In addition, a half-wave phase plate (comprising a first half-wave phase plate and a second half-wave phase plate) is provided at the end of the 3D display device and/or the end of the pair of 3D glasses, which can effectively solve the problem of dispersion caused by the aforesaid quarter-wave phase plates.

Hereinafter, implementations, functional features and advantages of the present disclosure will be further described with reference to embodiments thereof and the attached drawings.

DETAILED DESCRIPTION

Hereinafter, the technical solutions of the present disclosure will be further described in conjunction with the attached drawings and embodiments thereof. It shall be understood that, the embodiments described herein are only intended to illustrate but not to limit the present disclosure.

Figure 1:
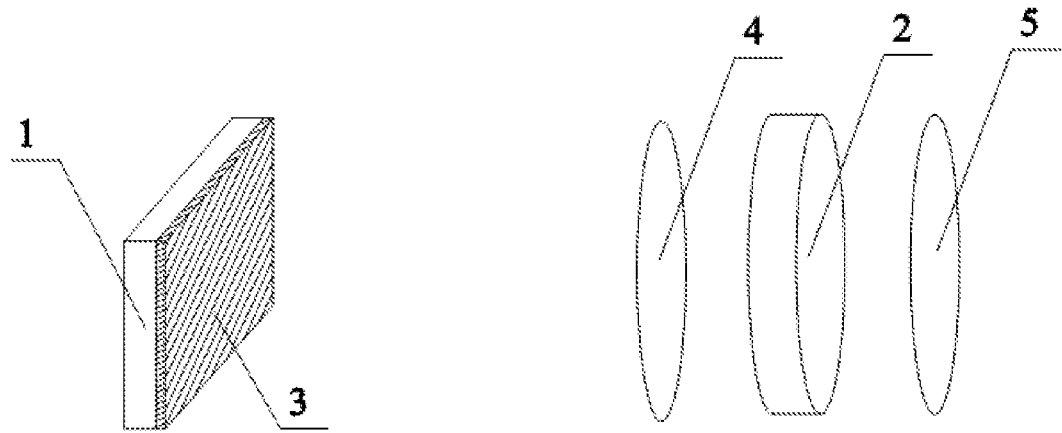
FIG. 1 is a schematic structural view of a 3D video playing apparatus in the prior art.
Figure 2:
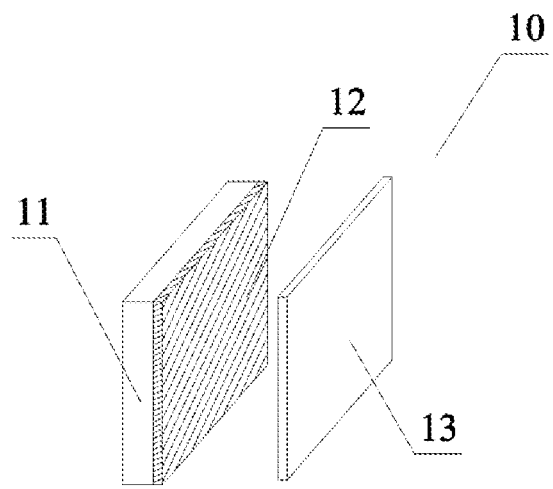
FIG. 2 is a schematic structural view of a first embodiment of a 3D display device according to the present disclosure.

The present disclosure relates to a 3D display device 10. Referring to FIG. 2, there is shown a schematic structural view of a first embodiment of the 3D display device 10 according to the present disclosure.

In this embodiment, the 3D display device 10 comprises a liquid crystal display (LCD) 11, a first polarizer 12 and a first quarter-wave phase plate 13. A surface of the first polarizer 12 abuts on a light exiting surface of the LCD 11. The first polarizer 12 matches with the light exiting surface of the LCD 11 in terms of both shape and size. The first quarter-wave phase plate 13 is disposed on the other surface of the first polarizer 12 and also matches with the light exiting surface of the LCD 11 in terms of both shape and size. A polarizing axis of the first quarter-wave phase plate 13 and a transmittance axis of the first polarizer 12 include an angle of 45° there between. A natural light emitted by the LCD 11 is converted by the first polarizer 12 into a linearly polarized light, which is then converted by the first quarter-wave phase plate 13 into a circularly polarized light. According to this embodiment, the technical shortcoming of a monotonic polarization direction of the polarized light emitted by the 3D display device 10 is overcome.

Figure 3:
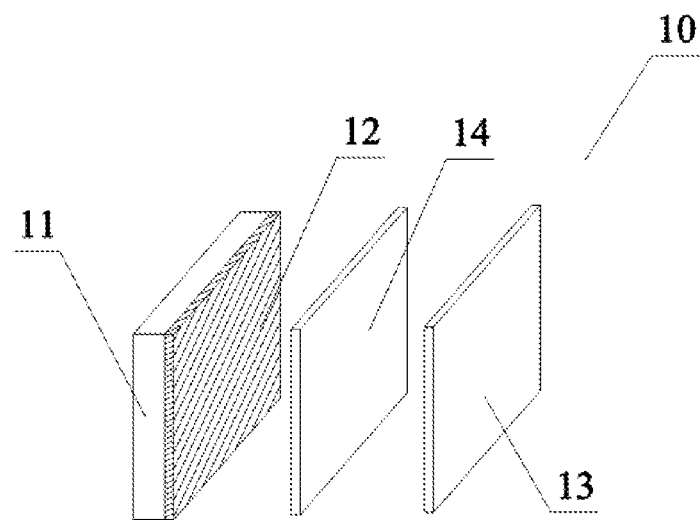
FIG. 3 is a schematic structural view of a second embodiment of the 3D display device according to the present disclosure.

Referring to FIG. 3, there is shown a schematic structural view of a second embodiment of the 3D display device 10 according to the present disclosure.

This embodiment differs from the first embodiment of the 3D display device 10 in that: the 3D display device 10 of this embodiment further comprises a first half-wave phase plate 14, which is disposed between the first polarizer 12 and the first quarter-wave phase plate 13. The half-wave phase plate 14 matches with the light exiting surface of the LCD 11 in terms of both size and shape. When a polarizing axis of the first half-wave phase plate 14 and the transmittance axis of the first polarizer 12 include an angle of $\theta_1$ there between, the polarizing axis of the first quarter-wave phase plate 13 and the transmittance axis of the first polarizer 12 include an angle of $2\theta_1+45°$ there between. In this embodiment, a retardation value of the light is in inverse proportion to the wavelength thereof, so a retardation value corresponding to a short wavelength is larger than a retardation value corresponding to a long wavelength; therefore, when the wavelength is in the magnitude of nm, the incident linearly polarized light will become the circularly polarized light after passing through the first quarter-wave phase plate 13. The retardation values corresponding to the wavelengths of 450 nm and 650 nm are different from the retardation value corresponding to the wavelength of 550 nm, and are generally called color shift retardation. Therefore, the linearly polarized light will not become a roundly polarized light after passing through the first quarter-wave phase plate 13, so a first half-wave phase plate 14 is additionally provided to solve the problem of dispersion which caused by the first quarter-wave phase plate 13. A second half-wave phase plate 24 described below has the same working principle and function as the first half-wave phase plate 14.

Figure 4:
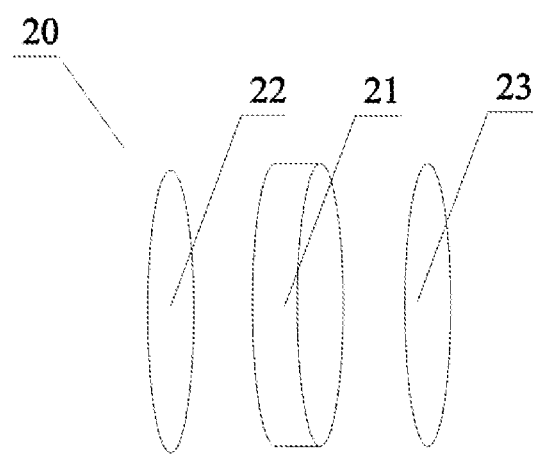
FIG. 4 is a schematic structural view of a first embodiment of glasses of a pair of 3D glasses according to the present disclosure.

The present disclosure further relates to glasses 20 of a pair of 3D glasses. Referring to FIG. 4, there is shown a schematic structural view of a first embodiment of the glasses 20 of the pair of 3D glasses according to the present disclosure.

In this embodiment, the pair of 3D glasses is used with the 3D display device 10. The pair of 3D glasses comprises a left glass 20 and a right glass 20 in symmetry with each other. Each of the glasses 20 comprises a second quarter-wave phase plate 22, a liquid crystal layer 21 and a second polarizer 23. The second quarter-wave phase plate 22 and the second polarizer 23 are located at two sides of the liquid crystal layer 21 respectively. The second quarter-wave phase plate 22 and the second polarizer 23 match with the liquid crystal layer 21 in both size and shape. When the pair of 3D glasses is used with the 3D display device 10, a surface of the second quarter-wave phase plate 22 shall face towards the light exiting surface of the 3D display device 10. The light emitted by the 3D display device 10 is converted by the first polarizer 12 into a linearly polarized light, which is then converted by the first quarter-wave phase plate 13 into a circularly polarized light. When entering into the pair of 3D glasses, the circularly polarized light is firstly transmitted through the second quarter-wave phase plate 22 of the glass 20, which restores the circularly polarized light into the linearly polarized light; then, the linearly polarized light passes through the liquid crystal layer 21 and is transmitted through the second polarizer 23; and finally, the linearly polarized light enters into human eyes to form an image. A polarizing axis of the second quarter-wave phase plate 22 and an absorbance axis of the second polarizer 23 include an angle of −45° there between.

In this embodiment, an angle of optical rotation is controlled through control of a twist angle of liquid crystals in the liquid crystal layer 21, and this can achieve the technical effect of a light gate in conjunction with the second polarizer 23. According to this embodiment, the light can propagate in the form of the circularly polarized light from the 3D display device 10 to the pair of 3D glasses, which overcomes the technical shortcoming of a decreased luminance of an image or even failure to form an image due to an inappropriate angle included between the pair of 3D glasses and the 3D display device 10.

Figure 5:
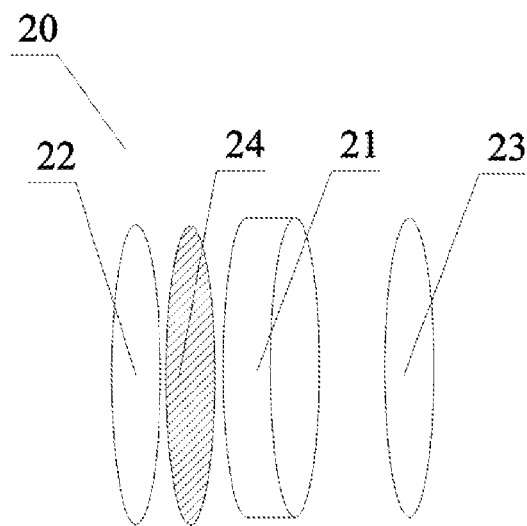
FIG. 5 is a schematic structural view of a second embodiment of the glasses of the pair of 3D glasses according to the present disclosure.

Referring to FIG. 5, there is shown a schematic structural view of a second embodiment of the glasses of the pair of 3D glasses according to the present disclosure.

This embodiment differs from the first embodiment of the glasses 20 of the pair of 3D glasses in that: each of the glasses of this embodiment further comprises a second half-wave phase plate 24, which is disposed between the second quarter-wave phase plate 22 and the liquid crystal layer 21 and matches with the liquid crystal layer 21 in terms of size and shape. When a polarizing axis of the second half-wave phase plate 24 and a polarizing axis of the second polarizer 23 include an angle of $-\theta_2$ there between, the polarizing axis of the second quarter-wave phase plate 22 and the polarizing axis of the second polarizer 23 include an angle of $-2\theta_2-45°$ there between.

The second half-wave phase plate 24 that is additionally provided can solve the problem of dispersion caused by the second quarter-wave phase plate 22.

Figure 6:
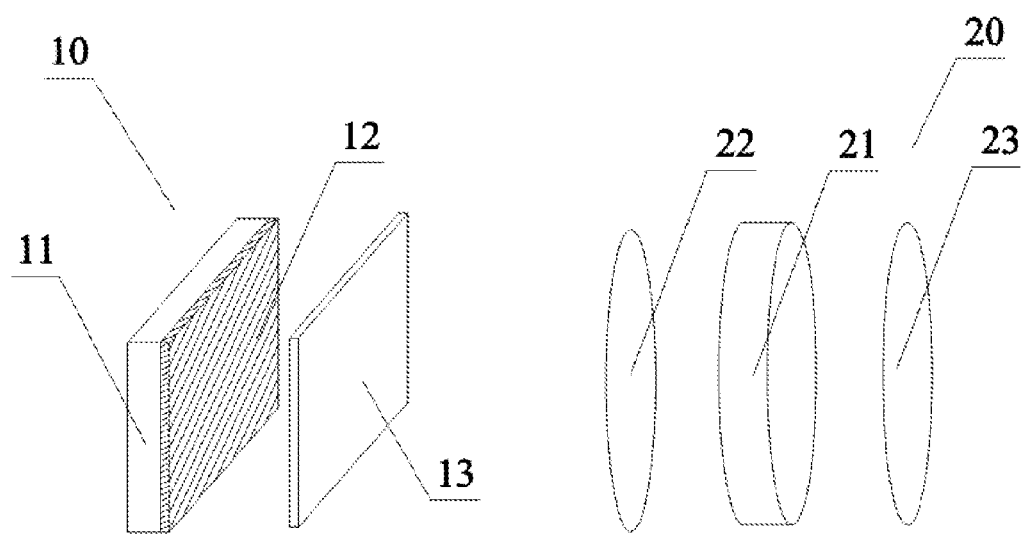
FIG. 6 is a schematic structural view of a first embodiment of a 3D video playing apparatus according to the present disclosure.

The present disclosure further relates to a 3D video playing apparatus. Referring to FIG. 6, there is shown a schematic structural view of a first embodiment of the 3D video playing apparatus according to the present disclosure.

In this embodiment, the 3D video playing apparatus comprises a 3D display device 10 and a pair of 3D glasses. The 3D display device 10 comprises an LCD 11, a first polarizer 12 and a first quarter-wave phase plate 13. A surface of the first polarizer 12 abuts on a light exiting surface of the LCD 11. The first polarizer 12 matches with the light exiting surface of the LCD 11 in terms of both shape and size. The first quarter-wave phase plate 13 is disposed on the other surface of the first polarizer 12 and also matches with the light exiting surface of the LCD 11 in terms of both shape and size. A polarizing axis of the first quarter-wave phase plate 13 and a transmittance axis of the first polarizer 12 include an angle of 45° there between. The pair of 3D glasses is used with the 3D display device 10. The pair of 3D glasses comprises a left glass 20 and a right glass 20 in symmetry with each other. Each of the glasses 20 comprises a second quarter-wave phase plate 22, a liquid crystal layer 21 and a second polarizer 23. The second quarter-wave phase plate 22 and the second polarizer 23 are located at two sides of the liquid crystal layer 21 respectively. The second quarter-wave phase plate 22 and the second polarizer 23 match with the liquid crystal layer 21 in both size and shape. Moreover, the pair of 3D glasses is located at the side of the light exiting surface of the 3D display device 10 and in a light path of the 3D display device 10; and the second quarter-wave phase plates 22 of the pair of 3D glasses face towards the light exiting surface of the 3D display device 10. A polarizing axis of the second quarter-wave phase plate 22 and an absorbance axis of the second polarizer 23 include an angle of −45° there between.

When the aforesaid 3D video playing apparatus is used, a surface of the second quarter-wave phase plate 22 shall face towards the light exiting surface of the 3D display device 10. The light emitted by the 3D display device 10 is converted by the first polarizer 12 into a linearly polarized light, which is then converted by the first quarter-wave phase plate 13 into a circularly polarized light. When entering into the pair of 3D glasses, the circularly polarized light is firstly transmitted through the second quarter-wave phase plate 22 of the glass 20, which restores the circularly polarized light into the linearly polarized light; then, the linearly polarized light passes through the liquid crystal layer 21 for optical rotation and is transmitted through the second polarizer 23; and finally, the linearly polarized light enters into human eyes to form an image. An angle of optical rotation is controlled through control of a twist angle of liquid crystals in the liquid crystal layer 21, and this can achieve the technical effect of a light gate in conjunction with the second polarizer 23.

According to the 3D video playing apparatus of this embodiment, the light can propagate in the form of the circularly polarized light from the 3D display device 10 to the pair of 3D glasses, which overcomes the technical shortcoming of a decreased luminance of an image or even failure to form an image due to an inappropriate angle included between the pair of 3D glasses and the 3D display device 10.

Figure 7:
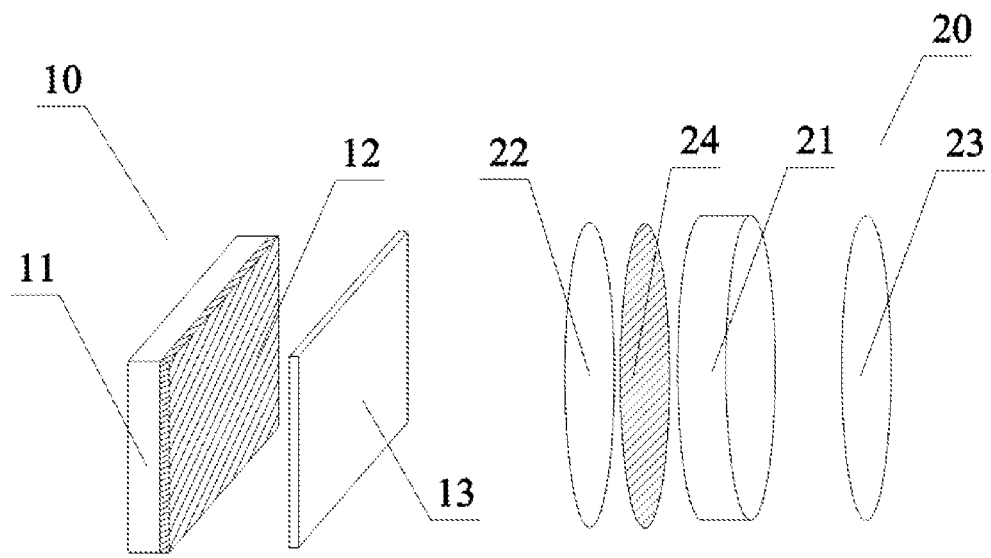
FIG. 7 is a schematic structural view of a second embodiment of the 3D video playing apparatus according to the present disclosure.

Referring to FIG. 7, there is shown a schematic structural view of a second embodiment of the 3D video playing apparatus according to the present disclosure.

This embodiment differs from the first embodiment of the 3D video playing apparatus in that: each of the glasses of this embodiment further comprises a second half-wave phase plate 24, which is disposed between the second quarter-wave phase plate 22 and the liquid crystal layer 21 and matches with the liquid crystal layer 21 in terms of size and shape. When a polarizing axis of the second half-wave phase plate 24 and the absorbance axis of the second polarizer 23 include an angle of $-\theta_2$ there between, the polarizing axis of the second quarter-wave phase plate 22 and the absorbance axis of the second polarizer 23 include an angle of $-2\theta_2-45°$ there between. The second half-wave phase plate 24 that is additionally provided can solve the problem of dispersion caused by the second quarter-wave phase plate 22.

Figure 8:
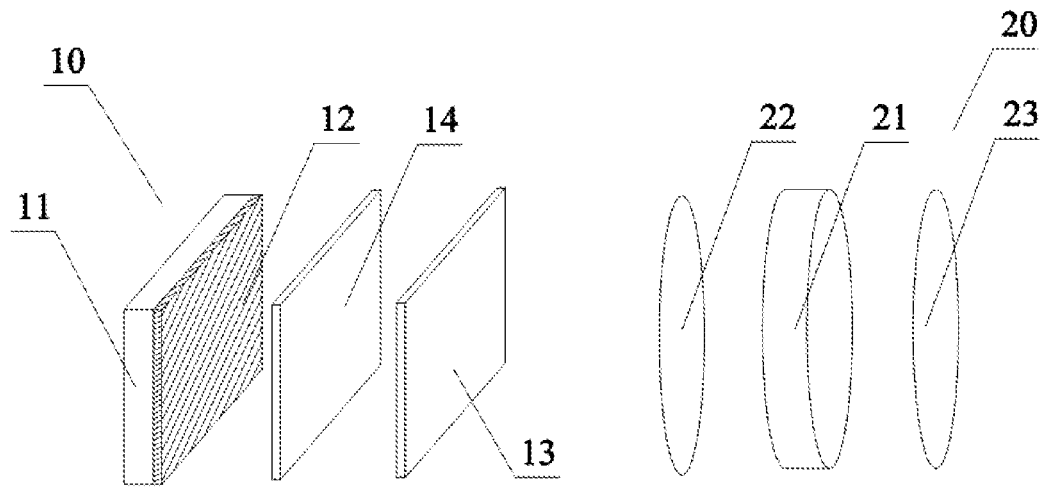
FIG. 8 is a schematic structural view of a third embodiment of the 3D video playing apparatus according to the present disclosure.

Referring to FIG. 8, there is shown a schematic structural view of a third embodiment of the 3D video playing apparatus according to the present disclosure.

This embodiment differs from the first embodiment of the 3D video playing apparatus in that: the 3D display device 10 of this embodiment further comprises a first half-wave phase plate 14, which is disposed between the first polarizer 12 and the first quarter-wave phase plate 13. The first half-wave phase plate 14 matches with the light exiting surface of the LCD 11 in terms of both size and shape. When a polarizing axis of the first half-wave phase plate 14 and the transmittance axis of the first polarizer 12 include an angle of $\theta_1$ there between, the polarizing axis of the first quarter-wave phase plate 13 and the transmittance axis of the first polarizer 12 include an angle of $2\theta_1+45°$ there between. The first half-wave phase plate 14 that is additionally provided can solve the problem of dispersion caused by the first quarter-wave phase plate 13.

Figure 9:
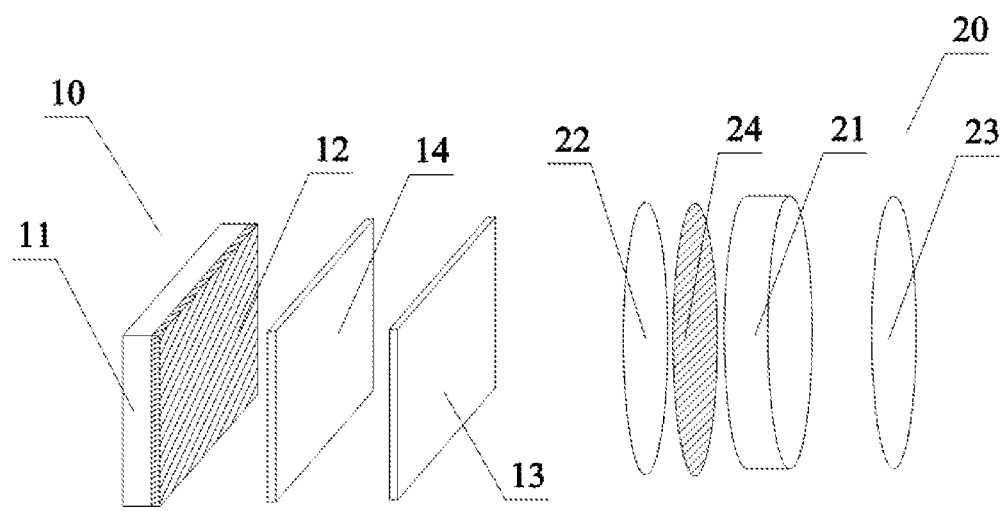
FIG. 9 is a schematic structural view of a fourth embodiment of the 3D video playing apparatus according to the present disclosure.

Referring to FIG. 9, there is shown a schematic structural view of a fourth embodiment of the 3D video playing apparatus according to the present disclosure.

This embodiment differs from the first embodiment of the 3D video playing apparatus in that: the 3D video playing apparatus of this embodiment further comprises a first half-wave phase plate 14 and a second half-wave phase plate 24; and the first half-wave phase plate 14 is disposed between the first polarizer 12 and the first quarter-wave phase plate 13 and matches with the light exiting surface of the LCD 11 in terms of both size and shape. When a polarizing axis of the first half-wave phase plate 14 and the transmittance axis of the first polarizer 12 include an angle of $\theta_1$ there between, the polarizing axis of the first quarter-wave phase plate 13 and the transmittance axis of the first polarizer 12 include an angle of $2\theta_1+45°$ there between. The second half-wave phase plate 24 is disposed between the second quarter-wave phase plate 22 and the liquid crystal layer 21 and matches with the liquid crystal layer 21 in terms of size and shape. When a polarizing axis of the second half-wave phase plate 24 and the absorbance axis of the second polarizer 23 include an angle of $-\theta_2$ there between, the polarizing axis of the second quarter-wave phase plate 22 and the absorbance axis of the second polarizer 23 include an angle of $-2\theta_2-45°$ there between. The first half-wave phase plate 14 that is additionally provided can solve the problem of dispersion caused by the first quarter-wave phase plate 13. The second half-wave phase plate 24 that is additionally provided can solve the problem of dispersion caused by the second quarter-wave phase plate 22.

According to the pair of 3D glasses and the 3D video playing apparatus of the present disclosure, a quarter-wave phase plate (comprising a first quarter-wave phase plate 13 and a second quarter-wave phase plate 22) is provided at the end of the LCD 11 and the end of each of the glasses 20 of the pair of 3D glasses respectively, so that the light propagates in the form of the circularly polarized light from the 3D display device 10 to the pair of 3D glasses. Thereby, the technical shortcoming of a decreased luminance of an image or even failure to form an image due to an inappropriate angle included between the pair of 3D glasses and the 3D display device 10 is overcome. In addition, a half-wave phase plate (comprising a first half-wave phase plate 14 and a second half-wave phase plate 24) is provided at the end of the 3D display device 10 and/or the end of each of the glasses 20 of the pair of 3D glasses, which can effectively solve the problem of dispersion caused by the aforesaid quarter-wave phase plates.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A 3D video playing apparatus, comprising a 3D display device and a pair of 3D glasses, wherein
the 3D display device comprises a liquid crystal display, a first polarizer and a first quarter-wave phase plate, a surface of the first polarizer abuts on a light exiting surface of the LCD, the first polarizer matches with the light exiting surface of the LCD in both size and shape, the first quarter-wave phase plate is disposed on the other surface of the first polarizer and matches with the light exiting surface of the LCD in both size and shape;
the pair of 3D glasses comprises a left glass and a right glass in symmetry with each other, each of the glasses comprises a liquid crystal layer as well as a second quarter-wave phase plate and a second polarizer disposed at two sides of the liquid crystal layer respectively, and further a second half-wave phase plate disposed between the second quarter-wave phase plate and the liquid crystal layer, wherein the second quarter-wave phase plate, the second half-wave phase plate, and the second polarizer match with the liquid crystal layer in both size and shape; and
the pair of 3D glasses is located at the side of the light exiting surface of the 3D display device and in a light path of the 3D display device with the second quarter-wave phase plates of the pair of 3D glasses facing towards the light exiting surface of the 3D display device.

* * * * *